Sept. 29, 1964      E. KIRKEBY      3,150,891

JOINT ARRANGEMENT

Filed Nov. 27, 1961

INVENTOR.
EIVIND KIRKEBY
BY
ATTORNEY

United States Patent Office 3,150,891
Patented Sept. 29, 1964

3,150,891
JOINT ARRANGEMENT
Eivind Kirkeby, Gladengveien 14, Oslo, Norway
Filed Nov. 27, 1961, Ser. No. 155,029
Claims priority, application Norway Dec. 15, 1960
6 Claims. (Cl. 287—92)

The invention relates to a joint arrangement having friction elements making it possible that a tubular arm may be adjusted and kept in desired position, for instance as in desk lamps or the like. More specifically the invention comprises such a joint arrangement where the end of the tubular lamp-carrying arm, through which the current supply lead goes, is journaled in a housing secured to the outer surface of the lampshade.

It has been proposed to provide the end of the lamp arm with ribs, grooves or the like for engagement in complementarily formed parts on the inner surfaces of two halves of a turnable disc surrounding said end, which halves are rotatably journaled in a housing, between the side walls of which and the outer surfaces of the disc halves friction members are arranged.

According to the invention these friction members have the form of spring plates, one on each side and arranged with intermediate members consisting of rest surface plates so formed that they are prevented from rotation when the arm is moved in the housing.

By this journaling of the lamp arm in the housing one obtains a very favourable arrangement of the relatively movable surfaces. At the same time the wear is evenly distributed over relatively great areas, thus greatly prolonging the useful life of the joint.

According to the preferred embodiment of the invention the end of the lamp arm is provided with a circumferentially extending rib journaled in a corresponding groove in the turnable disc halves, said groove being provided with a lug and said rib being provided with a corresponding protrusion, said lug and protrusion cooperating to limit rotation of the arm to a little less than 360°.

Figure 1:
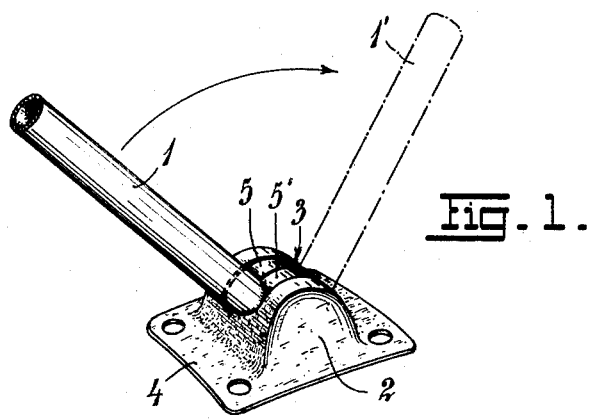
FIG. 1 is a perspective view of a joint according to the invention.
Figure 2:
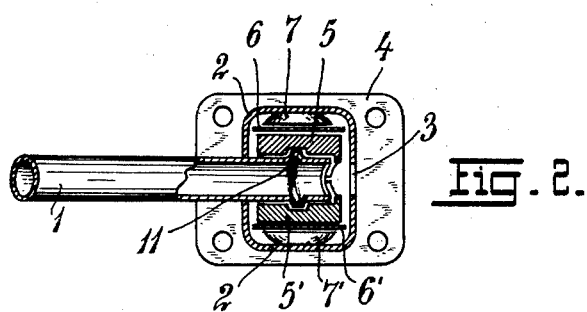
FIG. 2 is a horizontal axial section through the device of FIG. 1.

The joint for the arm 1 comprises a housing 2 formed from pressed plate material and provided with a securing flange 4 provided with holes for screws for securing the housing to the outer surface of the lamp shade, not shown. The housing includes spaced parallel walls upstanding from flange 4. The generally semi-circular edges of these walls are inwardly flanged toward each other to define between them a slot 3 between which arm 1 extends with a smooth fit. The end of the arm 1 is formed with a circumferential collar or rib 11. Referring to FIG. 2, there are provided two members 5 and 5' each of which is essentially a simple round flat disc. Each disc has formed on one flat circular face, a diametrically-extending channel 14 sized and shaped to fit about the contiguous end of arm 1. Between its ends, this channel is provided with a groove 8 to receive the collar or rib 11 of the arm. Thus when discs 5 and 5' and arm 1 are assembled as in FIGURES 1 and 2, the arm may rotate about its longitudinal axis, relatively to the discs, but is held against axial translation relatively thereto.

To prevent the current supply lead which is passed through the tubular arm 1 from being twisted too much, said rotating movement is restricted to somewhat less than a 360° rotation, by means of providing the half 8 and the rib 11 with cooperating lugs or protrusions 9 and 12 respectively. The end of the arm 1 thus can rotate in the groove 8 provided in each of the disc halves 5—5' somewhat less than 360°.

Figure 4:
FIG. 4 is an elevation of one of the two duplicate spring washers.
Figure 6:
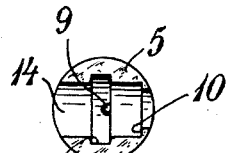
FIG. 6 is an elevation of one of the two discs.
Figure 3:
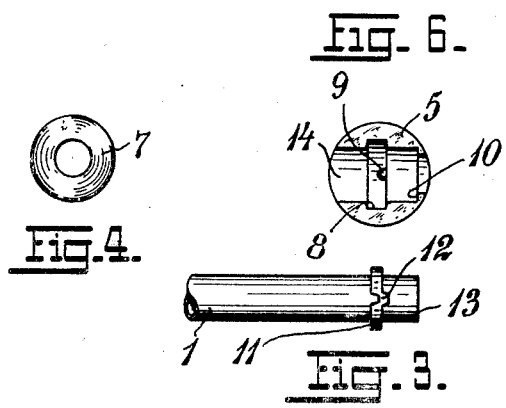
FIG. 3 is a view showing the construction of the end of the arm forming a part of the joint.
Figure 5:
FIG. 5 is an elevation of one of the two duplicate friction plates.

Between the outer surfaces of the disc halves 5—5' and the inner surface of the walls of the housing 2 there are arranged friction members in the form of rest surface plates 6 and on the outside thereof dished spring washers 7. The plates 6 have the form shown in FIG. 5 so that they cannot rotate in the housing when the arm 1 is moved in relation thereto. The spring washer 7 is as shown in FIG. 4 of a commonly known type. The assembly of the joints parts is very simple. One only needs to place the two disc halves 5—5' so that they surround the end of the arm 1 with collar 11 in the groove 8. In this position said parts are brought in place in the housing 2 as shown in FIG. 1. On each side of the disc halves 5—5' is then placed a rest surface plate 6—6', and a spring washer 7—7' is pressed in so that the parts have the position clearly shown in the axial section of FIG. 2.

In the assembled condition the spring washers 7—7' will exert a pressure on the outer surfaces of the plates 6—6', which plates thereby with their inner surfaces are evenly pressed against the entire outer surface of the rotatable disc halves 5—5'. All relative movement and wear thus occurs between these parts only. By this arrangement is obtained a very even and reliable friction which holds lamp arm 1 in the desired angular position in relation to the housing 2 which is secured to the lamp shade. Further no wearing of the inner surfaces of the housing will occur, as the rest surface plates cannot rotate in the housing so that no rotation is imparted to spring washers 7—7'. The spring pressure against the outer surfaces of the two turnable disc halves also will press these with an even pressure against the end of the lamp arm which they surround. Rotation of arm 1 in the channel 14 in the disc halves thus will be favorably spring loaded to obtain the desired friction resisting rotation and maintenance in desired position.

The dismantling of the described parts is as simple as the mounting. One only needs by means of a suitable tool to remove one or both spring washers or the rest surface plates, whereby the lamp arm and the surrounding disc halves may be freely removed from the housing.

In mounted position said articulated joint provides a compact and solid journaling for the lamp arm, which arrangement occupies a minimum of space and has a pleasing appearance. The several parts are easily fabricated.

For further support of the lamp arm in the channel 14 this channel may be reduced in diameter at its end contiguous the end of arm 1, to form an abutment or rim 10 against which the end of the arm contacts, so that axial thrust on the arm is taken by this rib, rather than by lug 12, as would otherwise be the case.

It should be understood that the described device may be modified in various ways within the scope of the invention. Thus the inner end of the arm can be provided with a groove and the disc halves 5—5' can be provided with a correspondingly formed circular protruding rib. Further it will be understood that the movability of the arm in relation to the housing can be arranged over a substantially greater angle than the approximately 90° shown in FIG. 1.

I claim:

1. In a joint as described, a housing including a mounting flange and first and second spaced parallel walls upstanding therefrom, an arm having a longitudinal axis and an external circular rib integral therewith and adjacent one end thereof, coaxial of said axis, first and second flat discs, each having on its inner face a channel extending diametrically there-across, said channels receiving and fitting about said one end of said arm, there being an arcuate groove in each said channel between its ends and coaxial of said channel, to rotatably receive said rib, first and second plates non-rotatably mounted in said housing, each contacting the outer flat face of a respective one of said discs, and first and second spring washers each interposed between a respective one of said plates and a corresponding spaced parallel wall of said housing, to thereby urge said discs into contact with said arm and mount said arm for rotation about its longitudinal axis and about a second axis normal to said longitudinal axis and said walls.

2. The joint of claim 1, each said washer being dished and centrally pierced to define coaxial edges bearing upon the corresponding plate and wall, respectively.

3. The joint of claim 1, each said wall of said housing being generally flat and semicircular in shape and having a flanged rim, said rims conjointly defining an arcuate slot between which said arm extends with a smooth fit for rotation about said second axis.

4. The joint of claim 1, there being a lug integral with one said disc and projecting into the groove thereof, there also being a lug integral with said rib, said lugs cooperating to limit rotation of said arm about its longitudinal axis.

5. The joint of claim 1, one end of said channel in each said disc being provided with an inwardly-projecting rim and against which the end of the arm bears.

6. In a joint as described, a one-piece housing including a mounting flange and first and second spaced parallel walls upstanding therefrom, a tubular arm having a longitudinal axis of symmetry and an external circular rib integral therewith and adjacent one end thereof, coaxial of said axis, first and second flat circular discs, each having on its inner face a channel arcuate in cross section and extending diametrically thereacross, said channels receiving and fitting about said one end of said arm to mount the same for rotation about its said longitudinal axis, there being an arcuate groove in each said channel between its ends and coaxial of said channel, to rotatably receive said rib and prevent axial translation of said arm relatively to said discs, first and second plates non-rotatably mounted in said housing, each contacting the outer flat face of a respective one of said discs, first and second dished spring washers each interposed between a respective one of said plates and a corresponding wall of said housing to thereby urge said discs into frictional contact with said arm and mount the same for rotation about a second axis normal to said longitudinal axis and said walls, said walls having substantially semicircular flanges conjointly defining a slot through which said arms extends.

References Cited in the file of this patent

UNITED STATES PATENTS

| | | |
|---|---|---|
| 2,003,539 | Hufferd | June 4, 1935 |
| 2,182,601 | Venditty | Dec. 5, 1939 |
| 2,643,144 | Schwartz | June 23, 1953 |